United States Patent [19]
Aoki et al.

[11] Patent Number: 5,691,525
[45] Date of Patent: Nov. 25, 1997

[54] DATA TRANSFER SYSTEM AND DATA TRANSFER TERMINAL DEVICE

[75] Inventors: Shigeo Aoki, Ikoma; Takuya Oka, Hirakata; Yukihiko Kimura, Ikoma, all of Japan

[73] Assignee: Matsushita Electric Industrial Co., Ltd., Osaka-fu, Japan

[21] Appl. No.: 767,150

[22] Filed: Dec. 16, 1996

Related U.S. Application Data

[63] Continuation of Ser. No. 854,661, filed as PCT/JP91/01166, Aug. 31, 1991, abandoned.

[30] Foreign Application Priority Data

Aug. 31, 1990 [JP] Japan ..................... 2-231720

[51] Int. Cl.$^6$ ..................... G06F 17/60
[52] U.S. Cl. ..................... 235/379; 235/380
[58] Field of Search ..................... 235/379, 380, 235/381

[56] References Cited

U.S. PATENT DOCUMENTS

| | | | |
|---|---|---|---|
| 4,007,355 | 2/1977 | Moreno | 235/379 |
| 4,454,414 | 6/1984 | Benton | 235/379 |
| 4,709,136 | 11/1987 | Watanabe | 235/379 |
| 4,709,137 | 11/1987 | Yoshida | 235/379 |
| 4,745,265 | 5/1988 | Douno et al. | 235/379 |
| 4,877,947 | 10/1989 | Mori | 235/381 |
| 5,120,945 | 6/1992 | Nishibe et al. | 235/379 |
| 5,175,416 | 12/1992 | Mansvelt et al. | 235/379 |

FOREIGN PATENT DOCUMENTS

| | | |
|---|---|---|
| 0 256 768 A2 | 8/1987 | European Pat. Off. |
| 0 421 808 A3 | 10/1990 | European Pat. Off. |
| 58-53784 | 12/1983 | Japan . |
| 61-278989 | 12/1986 | Japan . |
| 62-501239 | 5/1987 | Japan . |

*Primary Examiner*—Harold Pitts
*Assistant Examiner*—Jeffrey R. Filipek
*Attorney, Agent, or Firm*—Wenderoth, Lind & Ponack

[57] ABSTRACT

In a financial transaction data processing system, plural host computers maintained by banks and containing bank account information are interconnected by a communications network, and plural automated teller machines are connectable to the plural host computers. Portable data carriers are provided each containing a non-volatile memory for storing money balances. Also, at a wholesaler location or the like, a terminal device connectable to at least one of the host computers is provided. The portable data carriers are insertable into the automated teller machines to transfer money from a bank account to the portable data carrier inserted in the automated teller machine. Also, the portable data carriers are insertable into the terminal device to transfer money from the inserted portable data carrier to a memory of the terminal device. Accumulated transactions in the terminal device are stored on another portable data carrier which is then taken to an automated teller machine to transfer the money from the portable data carrier to a bank account of the wholesaler or the like. Also, verification of the transaction is effected by transmitting data from the terminal device to a connected host computer.

11 Claims, 3 Drawing Sheets

DATA TRANSFER SYSTEM AND DATA TRANSFER TERMINAL DEVICE

This is a continuation of application Ser. No. 07/854,661, filed as PCT/JP91/01166 Aug. 31, 1991, and now abandoned.

TECHNICAL FIELD

The present invention relates to data transfer system and data transfer terminal device used in transactions in which data is electronically transferred using plural portable data carriers located at wholesalers or the like where cash is exchanged in the distribution of goods.

TECHNICAL BACKGROUND

Cash and checks have been used in the distribution of goods at locations, such as wholesalers, which trade in cash and which do not use pay-later settling devices such as credit sales, bill and credit cards, etc.

In such distribution, however, a relatively large amount of money is exchanged (generally hundreds of thousand of yen to millions of yen), and cash is too bulky or hard to count, and the carrying of a huge sum of cash itself presents a risk of theft.

On the other hand, the check is free of the problems of bulkiness and counting, but is inferior to cash in creditability and readiness in cashing. That is, the check suffers the problems of the risk of being dishonored, the expenditure of time for validation before cashing, and the impossibility of confirming the authenticity of its holder. That is, the security of the check is low, which induces crime. That is, if a criminal robs the authentic owner of a check and the owner is bound and cannot report the robbery, cashing of the check cannot be prevented.

SUMMARY OF THE INVENTION

To solve the above problems of the prior art, it is hence a primary object of the invention to present a data transfer system and data transfer terminal device capable of settling account transactions easily and with high security without requiring one to carry cash.

To achieve the above object, the data transfer system of the invention, using first and second data carriers, is designed to transfer either a part or a whole of the data held in the first data carrier to the second data carrier by using a data transfer terminal device, and verify the data transferred from the data transfer terminal device and the data from the second data carrier by using a host computer, thereby effecting settlement between the accounts of the owner of the first data carrier and the owner of the second data carrier.

The data transfer terminal device, possessing insertion slots for receiving two data carriers, is composed to be activated only when the two data carriers are inserted, and transfers either a part or a whole of the data held in the first data carrier to the second data carrier responsive to an instruction from the owner of the first data carrier.

This constitution makes it possible to easily transact with high security without using cash or checks.

DETAILED DESCRIPTION OF THE PREFERRED EMBODIMENT

Figure 1:
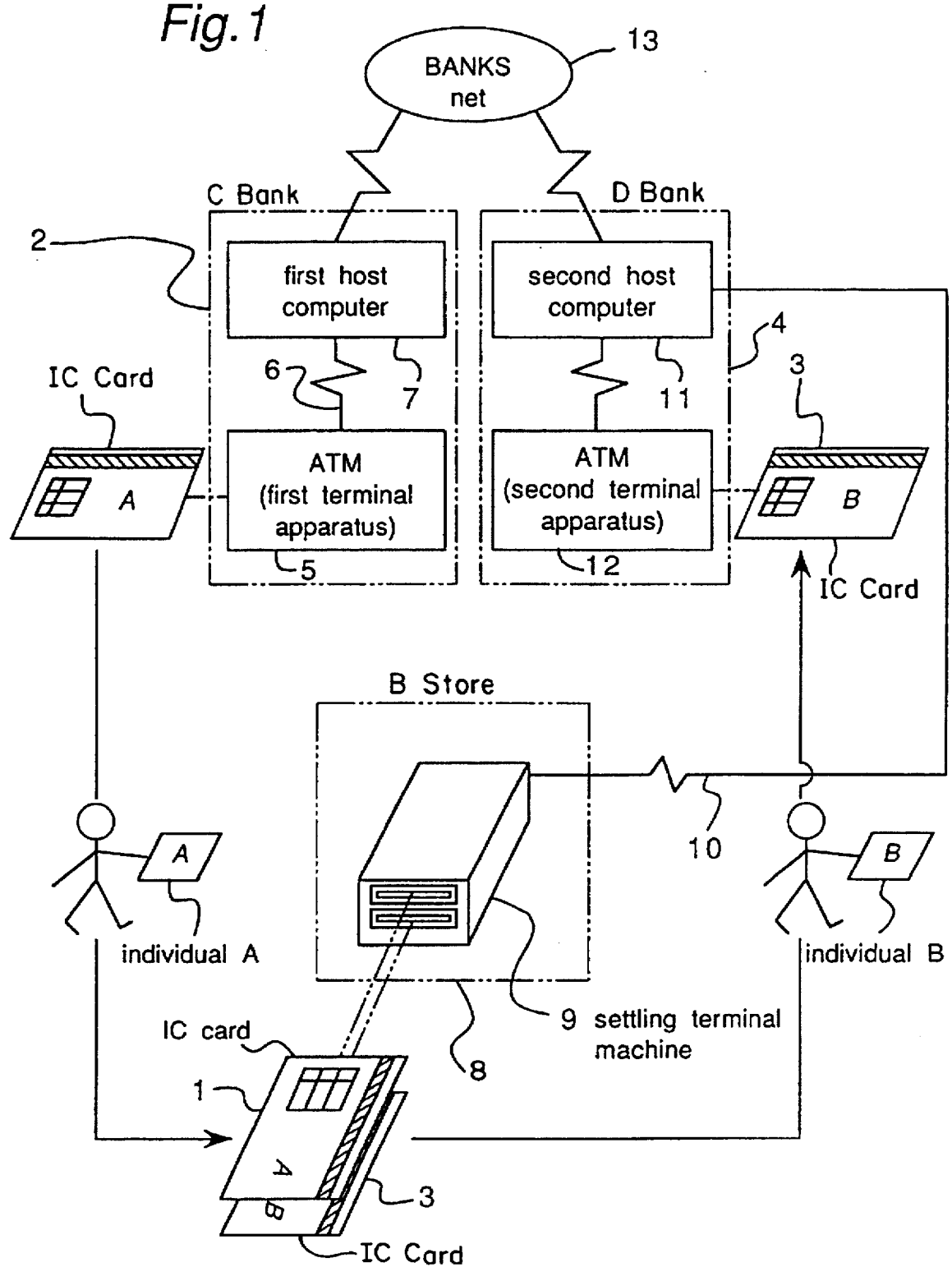
FIG. 1 is a block diagram of the account settling system using the data transfer system in an embodiment of the invention.

A block diagram of an account settling system using the data transfer system according to an embodiment of the invention is shown in FIG. 1. In FIG. 1, reference numeral 1 denotes a first data carrier (IC card A) which is issued by C bank 2 to an individual (or store or company) A having an account in the C bank 2. Reference numeral 3 denotes a second data carrier (IC card B) which is issued by D bank 4 to an individual (or store or company) B having an account in the D bank 4.

The operation of the account settling system using IC cards is explained below with reference to FIG. 1.

The individual A inserts the first IC card 1 into an ATM (automated teller machine) 5 of the C bank 2, and in response to specified key operations of the ATM 5, a certain amount of money, for example, 2 million yen is deducted from the account of the individual A and is retained in a recorded balance of an IC chip of the IC card 1. At the same time, data is transmitted to a host computer 7 connected with the ATM 5 through a communication line 6, and 2 million yen is extracted from the account balance of the individual A.

The individual A brings the first IC card 1 to a B store 8 for usage at the B store 8. The B store 8 is, for example, a pay-in-cash wholesaler. Assume the individual A is to pay, for example, 1,500,000 yen at the B store 8. The first IC card 1 is inserted into a first insertion slot of a settling terminal machine (or transaction terminal device) 9, and the B store 8 inserts the second IC card 3 into a second insertion slot of the settling terminal machine 9. As the individual A enters necessary details in the settling terminal machine 9, a specified amount (1,500,000 yen in this case) of the recorded balance (2 million yen in this case) held in the IC chip of the first IC card 1 is transferred to a recorded balance of an IC chip of the second IC card 3, so that the second IC card 3 receives 1,500,000 yen from the first IC card 1. Data describing this transaction (or second transaction verification data) is preliminarily sent to a host computer 11 of D bank 4 through a communication line 10.

Then, B store 8 brings the second IC card 3 to a D bank 4, and inserts the second IC card 3 into an ATM 12 of the D bank 4. The ATM 12 is operated as specified, so as to transfer, in this example, 1,500,000 yen from the recorded balance of the second IC card 3 into an account of the individual B held in the D bank 4. At this stage, verification of the money received by the second IC card 3 is carried out with reference to the transaction result preliminarily transmitted from the settling terminal machine 9 to the host computer 11. Further, as between the banks, account settlement is carried out by communication through, for example, a BANKS net 13.

In this procedure, funds may be transferred from the bank account of the individual A to the bank account of the B store 8 by using the two IC cards 1, 3 and the settling terminal machine 9, without the troublesome and perilous handling of cash or checks.

In this case, the initial communication of the result of the transaction from the settling terminal machine 9 to the host computer 11 through the communication line 10 (or an ordinary telephone circuit) is not necessarily an online real time transfer, but instead may be an offline batch transfer.

That is, in the off-business nighttime hours, weekends or holidays of D bank 4, plural transaction results may be accumulated in the settling terminal machine 9 of the B store 8. The accumulated transactions may then be transferred after the D bank 4 resumes business. Usually, the host computer 11 resumes its operation earlier than the transfer from the second IC card 3 to the bank account of the B store 8 using the ATM 12, and the transaction results in the settling terminal machine 9 have been already sent to the host computer 11. Therefore, the result of the transaction can be checked immediately on the point of receipt settlement by the ATM 12. However, if the result of transaction is not yet sent to the host computer 11 because, for example, the power of the settling terminal machine 9 has been cut off on a holiday of the B store 8, the transaction is treated as a "provisional receipt" at the time of receipt settlement at the ATM 12, and a formal receipt may be registered when the transaction result is later sent from the settling terminal machine 9. Therefore, it is of no consequence if the settling terminal machine 9 is remote from the bank. This is similar to the conventional transaction by check in which cash is not paid until the fund settlement is completed between the banks by confirmation of the amount of the check when the check is brought to the bank and entered in the bank book.

Figure 2:
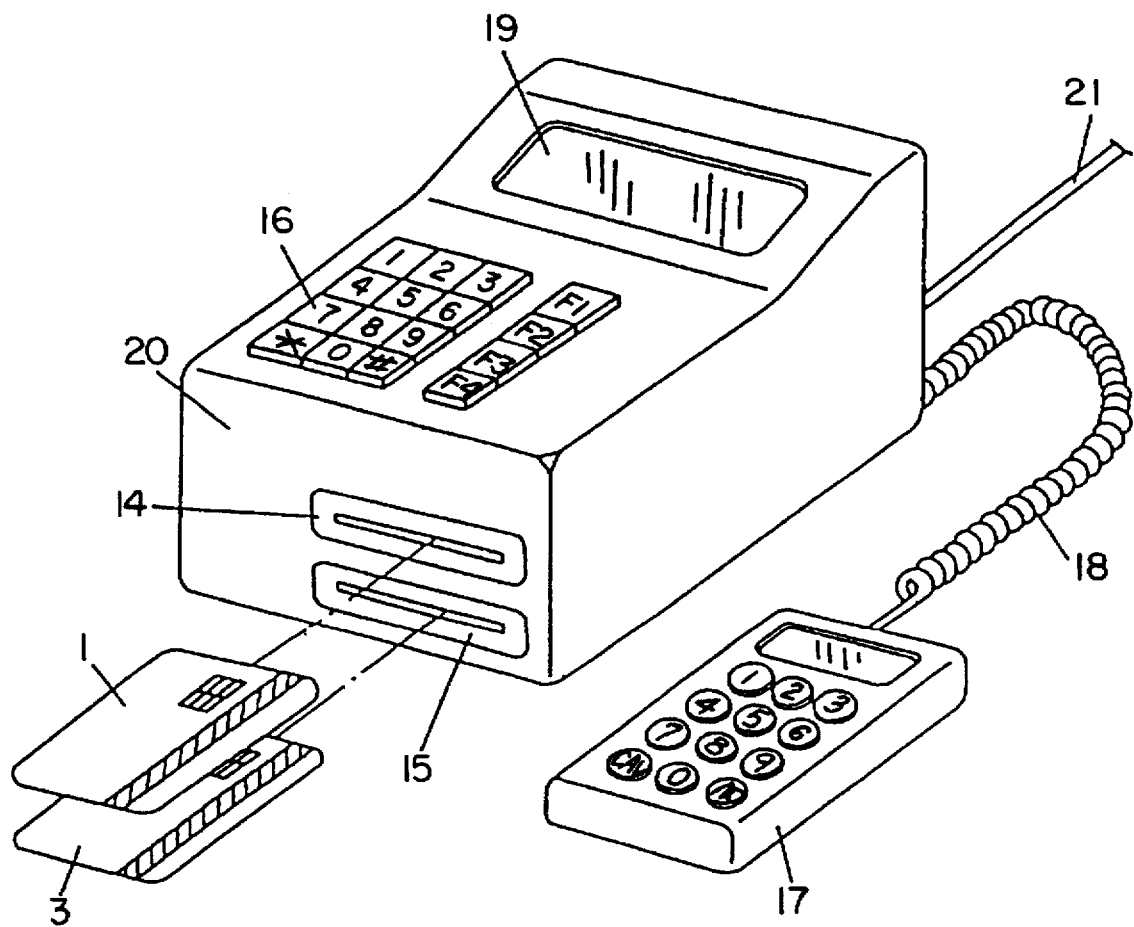
FIG. 2 is a perspective view of the settling terminal machine used in the account settling system in an embodiment of the invention.

FIG. 2 shows a perspective view of the settling terminal machine 9 used in the account settling system of the invention. The first IC card i is inserted into the first insertion slot 14 and the second IC card 3 is inserted into the second insertion slot 15. A key pad 16 is manipulated as specified, and the owner of the first IC card 1 enters his personal identification number through a pin pad 17, then the amount specified by the key pad 16 is transferred to the second IC card 3 from the amount retained in the recorded balance in the first IC card 1. Reference numeral 18 denotes a pin pad cord. The process and results of this transaction can be confirmed on a display 19. The transaction result is stored in the memory in a main body 20 of the settling terminal machine 9, and is transferred to the host computer (numeral 11 in FIG. 1) of the bank through a telephone cord 21.

Figure 3:
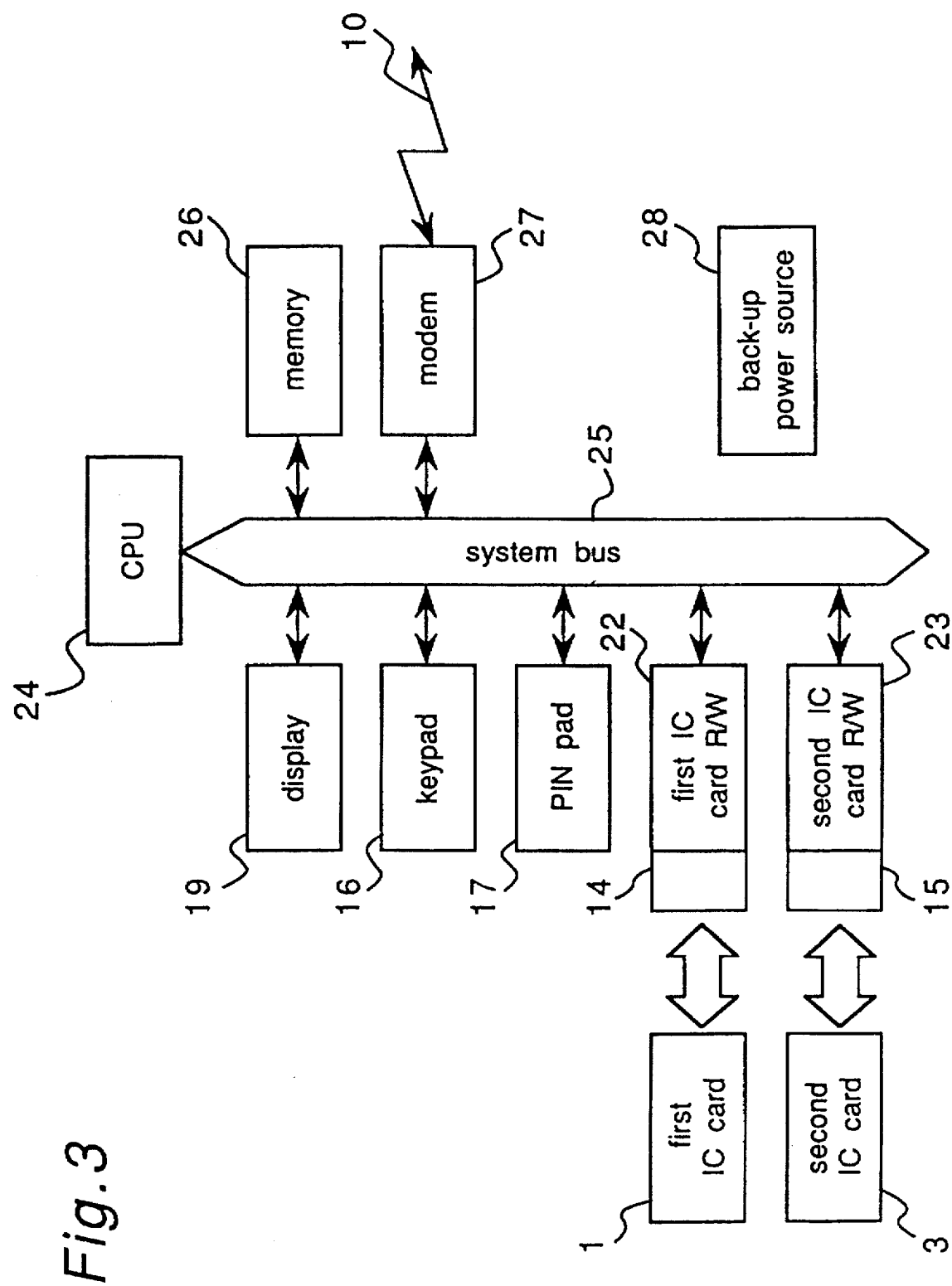
FIG. 3 is an operational block diagram of the same account settling terminal machine.

FIG. 3 is an operational diagram of the settling terminal machine 9 used in the account settling system of the invention.

The first IC card 1 is inserted into a first IC card reader/writer (R/W) 22 through the first insertion slot 14. The second IC card 3 is inserted into a second IC card R/W 23 through the second insertion slot 15. The owner of the first IC card 1 manipulates the key pad 16 as specified while monitoring the display 19, and enters the personal identification number of the first IC card i through the pin pad 17, then a CPU 24 transfers the specified funds from the first IC card 1 in the first IC card R/W 23 through a system bus 25, and stores the result of the transaction in a memory 26. The result of the transaction stored in the memory 26 is transferred to the bank through a modem 27 and communication line 10. A back-up power source 28 is provided in order to feed power to the CPU 24 and input and output devices so that normal processing may be completed even if a power failure occurs while processing. The memory 26 may be divided into a memory for storing programs, a memory for storing tentative information in the midst of processing, and a memory for storing the results of transactions. In particular, as a precautionary measure, the memory for storing the results of transactions may be an EEPROM (electrically erasable programmable read only memory) which is a nonvolatile memory that can be erased electrically but retains its content if the power is cut off. In the CPU 24, an enciphering logic is incorporated, and the data in the memory for storing the results of transactions is enciphered data so that it cannot be revised illegally, and thus due considerations are given to the safety and security of data in the settling terminal machine 9.

Similarly, the IC card 1 or 3 may also be enhanced in security by incorporating enciphering logic or the like.

In this embodiment, the ATM 5 or 12 is used as the input device into the IC card at the bank, but any other devices having the same functions may be used. Also, instead of the connection between two banks through BANKS net 13 as explained herein, the banks may be connected using a direct line or other network such as MICS net. Further, instead of the two banks 2 and 4, a post office or other financial institute may be connected. It is also possible to effect transactions within a same bank or a same post office. Still further, instead of the B store 8, the settling terminal machine 9 may be located in banks, post offices, or the like.

Thus, according to the invention, the account settling system using the simple and secure media of the IC cards is realized, and it is effective to solve the problems experienced in the conventional account settling using cash or check, including the trouble of counting, lack of readiness in cashing, low security, and risk of crime.

We claim:

1. A financial transaction data processing system comprising:

a plurality of host bank computers operatively maintained by a plurality of banking institutions and each containing account information denoting money balances of plural host bank accounts;

a communications network interconnecting said plurality of host bank computers;

a plurality of automated teller machines operatively maintained by the plurality of banking institutions and connectable to said plurality of host bank computers so as to access said account information to transfer money to and from said plural host bank accounts;

a transaction terminal device detachably and operatively connectable to at least one of said plurality of host bank computers, said transaction terminal device having two IC card insertion slots; and a plurality of portable IC cards each containing a non-volatile IC chip memory for storing a carrier money balance and each insertable into at least one of said plurality of automated teller machines and into one of said IC card insertion slots of said transaction terminal device;

wherein each of said automated teller machines includes means, responsive to the insertion therein of one of said portable IC cards and to input instructions, for effecting a first transaction by deducting a first specified amount of money from the balance of a designated host bank account of a connected one of said host bank computers and adding the first specified amount to the carrier money balance of said one of said portable IC cards;

wherein said transaction terminal device includes at least one manipulation key for specifying a second specified amount of money, transfer means, responsive to the insertion of two of said portable IC cards into said IC card insertion slots and to input instructions, for effecting a second transaction by deducting the second specified amount of money specified by said at least one manipulation key from the carrier money balance stored in the IC chip memory of a first of said two portable IC cards and adding the second specified amount of money to the carrier money balance stored in the IC chip memory of a second of said two portable IC cards, a memory for storing data relating to said second transaction, and transmitting means for transmitting second transaction verification data indicative of the second transaction from said memory to a connected one of said plurality of host bank computers;

wherein one of said automated teller machines further includes means, responsive to the insertion therein of said second of said portable IC cards and to input instructions, for initiating a verification process in which an amount of the carrier money balance of said second of said portable IC cards is verified with reference to said second transaction verification data transmitted to the connected one of the plurality of host bank computers by said transaction terminal device and, thereafter, if said second transaction verification data has been transmitted to said connected host bank computer, for effecting a third transaction by adding a third specified amount of money to a designated host bank account of a connected host bank computer and deducting the third specified amount from the carrier money balance of said second of said portable IC cards; and wherein, when said second of said portable IC cards is inserted into said one of said automated teller machines before said second transaction verification data has been transmitted to said connected one of the plurality of host bank computers by said transaction terminal device, said third transaction is effected after said second transaction verification data has been transmitted to said connected one of the plurality of host bank computers by said transaction terminal device.

2. A financial transaction data processing system as claimed in claim 1, wherein said memory of said transaction terminal device is for accumulating and storing a plurality of transaction data associated with a plurality of distinct second transactions, and wherein said transmitting means is for transmitting the plurality of the transaction data in batch to the connected one of the plurality of host bank computers for use in said verification process.

3. A financial transaction data processing system as claimed in claim 2, wherein said transaction terminal device includes said two IC card insertion slots within a single housing for inserting said first and second IC cards, respectively, into an interior of said single housing.

4. A financial transaction data processing system as claimed in claim 1, wherein said transaction terminal device includes said two IC card insertion slots within a single housing for inserting said first and second IC cards, respectively, into an interior of said single housing.

5. The financial transaction data processing system as claimed in claim 1, wherein said transmitting means is for effecting an online real time transfer of said second transaction verification data to said connected one of the host bank computers.

6. The financial transaction data processing system as claimed in claim 1, wherein the second transaction verification data stored in said memory is transmitted to the connected one of the host bank computers by said transmitting means via a modem and a communication line.

7. The financial transaction data processing system as claimed in claim 6, wherein said IC chip of each of said IC cards is provided with enciphering logic.

8. The financial transaction data processing system as claimed in claim 1, wherein said memory of said transaction terminal device includes a first memory for storing programs, a second memory for storing working data during processing, and a third memory for storing the data relating to the second transaction, wherein the third memory is a nonvolatile EEPROM.

9. The financial transaction data processing system as claimed in claim 8, wherein said transaction terminal device includes a CPU provided with enciphering logic, and wherein data stored in said third memory is enciphered.

10. The financial transaction data processing system as claimed in claim 1, wherein said transmitting means is operable to transmit said second transaction verification data to said connected one of said plurality of host bank computers as an online real time transfer and, alternatively, as a batch transfer at a time subsequent to said second transaction.

11. The financial transaction data processing system as claimed in claim 1, wherein when said second of said portable IC cards is inserted into said one of said automated teller machines before said second transaction verification data has been transmitted to said connected one of the plurality of host bank computers by said transaction terminal device, said third transaction is initially only provisionally effected, and is formally effected after said second transaction verification data has been transmitted to said connected one of the plurality of host bank computers by said transaction terminal device.

* * * * *